Aug. 15, 1950 W. H. T. HOLDEN 2,519,247

TIMING CIRCUIT

Filed Dec. 31, 1947 3 Sheets-Sheet 1

INVENTOR
W. H. T. HOLDEN
BY
P. C. Smith
ATTORNEY

INVENTOR
W. H. T. HOLDEN
BY P. C. Smith
ATTORNEY

Aug. 15, 1950 W. H. T. HOLDEN 2,519,247

TIMING CIRCUIT

Filed Dec. 31, 1947 3 Sheets-Sheet 3

INVENTOR
W. H. T. HOLDEN
BY P. C. Smith
ATTORNEY

Patented Aug. 15, 1950

2,519,247

UNITED STATES PATENT OFFICE 2,519,247

TIMING CIRCUIT

William H. T. Holden, Woodside, N. Y., assignor to Bell Telephone Laboratories, Incorporated, New York, N. Y., a corporation of New York Application December 31, 1947, Serial No. 795,021

1 Claim. (Cl. 250—27)

This invention pertains to timing circuits and more particularly to circuits in which a current-responsive device is made to respond a timed interval after a timing circuit is established.

In the case of a relay, the usual means for delaying the armature response is by means of a specially constructed relay or by means of a relay of standard construction used in conjunction with an electrical network and an electronic device or a unilateral cell. The timing action of these circuits is often unsuitable in situations which require a high degree of timing accuracy since these circuits are usually subject to substantial variations in time delay due to variations in supply voltage and, in some cases, to supply voltage transients.

An object of this invention is to provide a time-delay circuit whose operation is substantially independent of supply voltage variations and whose operation is not affected by supply voltage transients. These and other objects of the invention will be apparent from the following description, the appended claim, and the drawings, in which:

Figure 1:
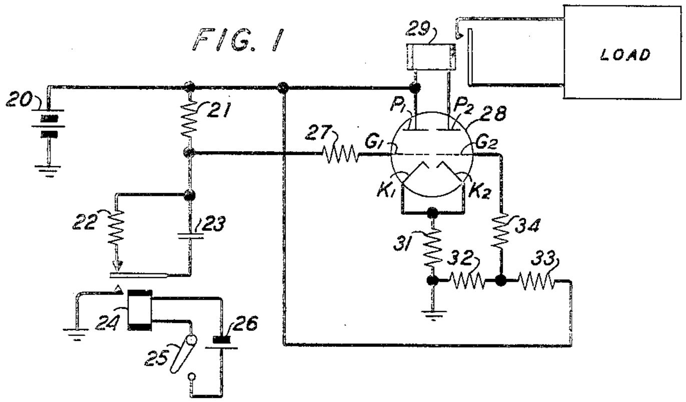
Fig. 1 is a time-delay circuit wherein the timing relay is energized when the timing circuit is established and is deenergized a fixed time thereafter.
Figure 2:
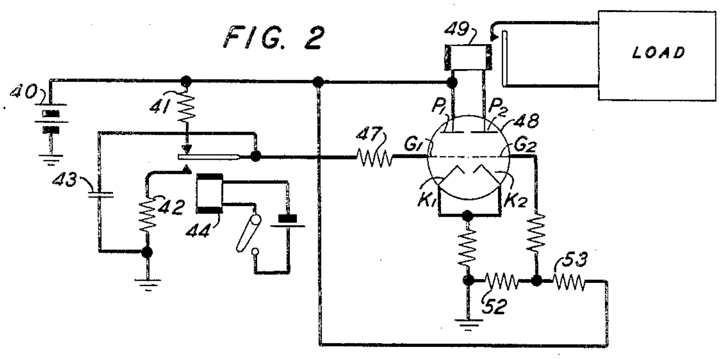
Fig. 2 is a time-delay circuit wherein the timing relay is initially deenergized and remains deenergized until a fixed time after the timing circuit is established.
Figure 3:
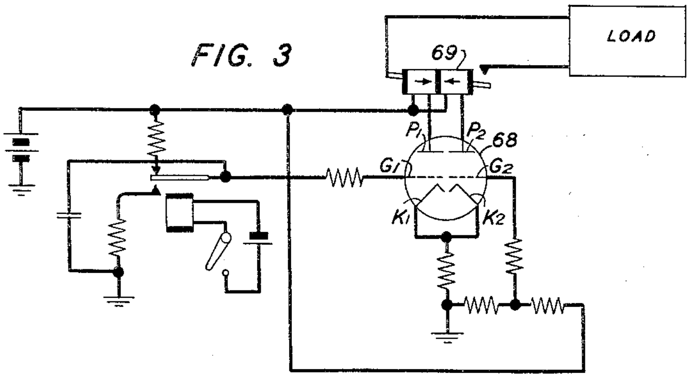
Fig. 3 is a modification of the circuit shown in Fig. 2 wherein a polar differential relay is used as the timing relay.
Figure 4:
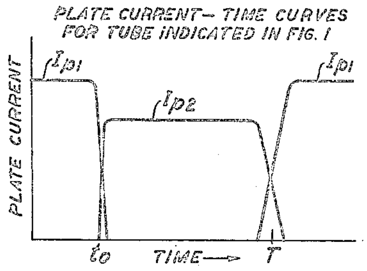
Figure 5:
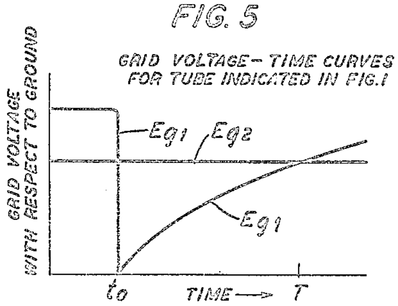
Figure 6:
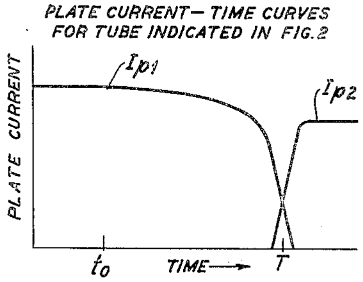
Figure 7:
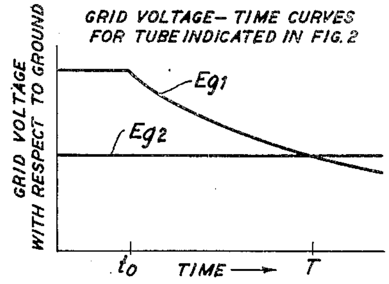
Figure 8:
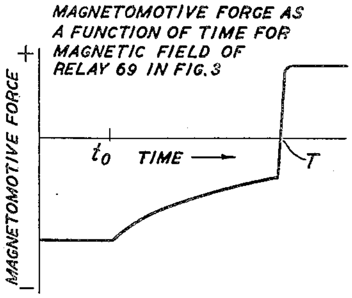
Figure 9:
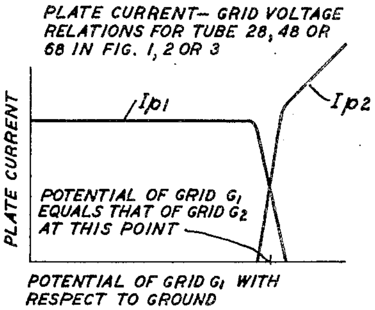
Figure 10:
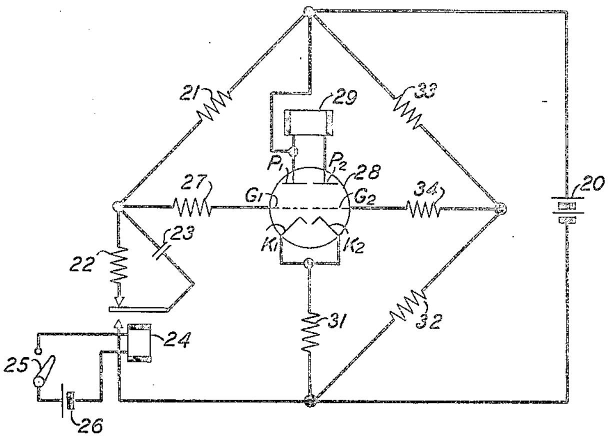
Figure 11:
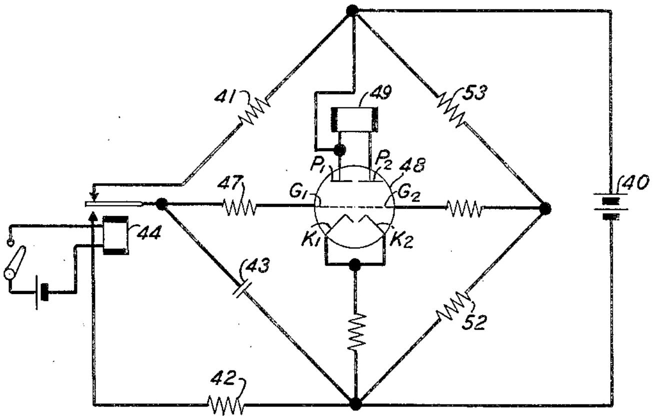

Fig. 4 indicates in a qualitative manner typical plate current time curves for the apparatus indicated in Fig. 1;

Fig. 5 indicates in a qualitative manner typical grid voltage time curves for the apparatus indicated in Fig. 1;

Fig. 6 indicates in a qualitative manner typical plate current time curves for the apparatus indicated in Fig. 2;

Fig. 7 indicates in a qualitative manner typical grid voltage time curves for the apparatus indicated in Fig. 2;

Fig. 8 indicates in a qualitative manner a typical magnetomotive force time curve for the magnetic field of the polar diffierential relay indicated in Fig. 3;

Fig. 9 indicates in a qualitative manner typical plate current-grid voltage relations for the apparatus shown in Figs. 1, 2 and 3;

Fig. 10 indicates the circuit diagram disclosed in Fig. 1 rearranged so that the voltage divider and the resistance-capacitance timing network employed in the circuit appear as elements of a bridge circuit; and Fig. 11 indicates the circuit diagram disclosed in Fig. 2 rearranged so that the voltage divider and the resistance-capacitance timing network employed in the circuit appear as elements of a bridge circuit.

The time-delay circuit shown in Fig. 1 comprises a twin triode vacuum tube wherein the grid voltage applied to one section of the tube is under the control of a starting relay and a resistance-capacitance network, and the grid voltage applied to the other section of the tube is under the control of a cathode follower coupling arrangement between the two triode sections. The timing relay which is in the plate circuit of one of the triodes is energized when the starting relay is operated and is deenergized a predetermined time thereafter.

The plate current and grid voltage relations with respect to time are indicated in Figs. 4 and 5 for the twin triode shown in Fig. 1.

When starting relay 24 indicated in Fig. 1 is released, the potential of battery 20 is applied to grid $G_1$ of tube 28 through resistors 21 and 27. Grid $G_1$ is thereby at a positive potential with respect to ground, and this potential is of such magnitude that grid $G_1$ is at a positive potential with respect to cathode $K_1$. Maximum plate current will flow in the left half of twin triode 28, and due to the voltage drop produced in resistor 31, cathodes $K_1$ and $K_2$ will be at a positive potential with respect to ground. The resistance of resistor 31 is proportioned to the other circuit components so that the magnitude of the potential drop across the resistor is approximately two-thirds to four-fifths the potential of battery 20. A voltage divider comprising resistors 32 and 33 applies a potential through resistor 34 to grid $G_2$ of tube 28, and these resistors are proportioned so that the potential applied to grid $G_2$ is substantially less than the potential applied between cathode and ground. Thus, grid $G_2$ will be at a negative potential with respect to cathode $K_2$, and the magnitude of this potential will equal the difference between the cathode potential developed across resistor 31 and the voltage drop across resistor 32. This potential applied to grid $G_2$ is identified in Fig. 5 as $E_{g2}$ and is sufficient to bias the right half of twin triode 28 to cut off and prevent the flow of plate current through the winding of relay 29. When switch 25 is closed, a circuit is completed from battery 26 through the winding of relay 24 which causes the armature of relay 24 to operate at the time $t_0$ as indicated on Figs. 4 and 5. Prior to the operation of relay 24, condenser 23 was discharged through resistor 22 and the armature of relay 24, and both plates of the condenser were at a potential with respect to ground equal to the potential of battery 20 less the voltage drop across resistor 21. This voltage drop results from the current which flows through grid $G_1$ since the grid is at a positive potential with respect to its cathode, and the drop is negligible since the resistance of resistor 21 is small compared with that of resistor 27. This grid potential is identified in Fig. 5 as $E_{g1}$. When the armature of relay 24 operates, it opens the condenser discharge path through resistor 22 and connects the lower terminal of condenser 23 to ground. Since the potential across a condenser cannot change suddenly, the upper terminal of the condenser is also at ground potential at the instant the relay operates. This sudden reduction in voltage will appear on grid $G_1$, reducing the potential of grid $G_1$ at time $t_0$ to zero volts with respect to ground and biasing the tube to cut-off, thereby preventing the flow of current through plate $P_1$. The plate current curves for plates $P_1$ and $P_2$ are identified in Fig. 4 as $I_{p1}$ and $I_{p2}$ respectively. While the plate current is being cut off the cathode potential of both halves of tube 28 will drop back until the cathode potential reaches a value which is slightly positive with respect to the voltage applied to grid $G_2$ through the divider formed by resistors 32 and 33. Current will now flow in the right half of tube 28 from battery 20 through the winding of relay 29, between plate $P_2$ and cathode $K_2$, and through resistor 31 to ground. Relay 29 will operate at this time, the delay after the operation of relay 24 being very small since the current redistribution described above is delayed only by the effect of the interelectrode capacitances of the two triode tube sections and the inductance of relay 29. The winding of relay 29 must be of low resistance so as to avoid a substantial drop in the voltage applied to plate $P_2$. The operation of the armature of relay 29 serves to complete an electrical path in which load 30 is one element. It is apparent that the operation of relay 29 may serve any purpose which may be performed by standard type relays.

Current from battery 20 now charges condenser 23 through resistor 21, and the potential across the condenser may be calculated by the following formula:

$$E=E_{20}\left(1-\epsilon^{-\frac{t-t_0}{R_{21}C_{23}}}\right)$$

where E is the voltage across the condenser, $E_{20}$ is the voltage of battery 20, $\epsilon$ is the base of natural logarithms and equals 2.71828, $R_{21}$ is the resistance of resistor 21, $C_{23}$ is the capacitance of condenser 23, $t_0$ is the time at which condenser 23 is grounded and $t$ is any time later than $t_0$.

In accordance with the properties of this circuit in which a pair of triodes operate into a common cathode load, current $I_{p1}$ will be zero until the voltage applied to grid $G_1$ approaches the fixed voltage applied to grid $G_2$ as shown in Fig. 9. When this occurs, the plate current in the right half of tube 28 will decrease rapidly and the plate current in the left half will increase rapidly. As indicated in Fig. 4, relay 29 releases at time T as the current through the right half of the tube decreases.

In order to restore the circuit, switch 25 is opened, thereby deenergizing relay 24. When the armature of relay 24 releases, condenser 23 is disconnected from ground and discharged through resistor 22. Relay 29 remains unoperated during the period in which the circuit is restored since the potential of grid $G_1$ with respect to cathode $K_1$ is maintained at a voltage which permits the left half of twin triode 28 to conduct current continuously.

Thus, the closure of switch 25 will cause the operation of relay 29, and relay 29 is held operated for a predetermined length of time and then released, the release occurring when the control grid potentials of the two triodes are approximately equal.

Resistor 27 is connected in series with grid $G_1$ and resistor 34 is connected in series with grid $G_2$, each introducing a small voltage drop when the control grid with which it is associated is at a positive potential with respect to its cathode. The magnitude of this voltage drop is small compared with that across the other circuit components, and, since the two resistors are of equal resistance, the effect of this voltage drop will be negligible and is not taken into consideration for the purpose of this disclosure.

Since the potential applied to grid $G_2$ is equal to $$E_{20}\frac{R_{32}}{R_{32}+R_{33}}$$

where $E_{20}$ is the potential of battery 20, $R_{32}$ is the resistance of resistor 32, and $R_{33}$ is the resistance of resistor 33; and since the potential applied to the grid $G_1$ is determined by the relation $$E=E_{20}\left(1-\epsilon^{-\frac{t-t_0}{R_{21}C_{23}}}\right)$$

it is apparent that $$E_{20}\left(1-\epsilon^{-\frac{t-t_0}{R_{21}C_{23}}}\right)=E_{20}\frac{R_{32}+R_{33}}{R_{32}}$$

When relay 29 releases at time T, T may be substituted for the symbol $t$ in the above equation and the equation may be reduced to the following:

$$T-t_0=R_{21}C_{23}\log_{\epsilon}\frac{(S_{32}+R_{33})}{R_{32}}$$

It will be observed that the interval $T-t_0$ represents the time during which relay 29 is operated and that the time as expressed by the equation above is independent of $E_{20}$, the potential of the battery. This relation is true only to the extent that the voltage difference between grids $G_1$ and $G_2$ is negligible compared to the potential of battery 20 when the release of relay 29 occurs. In practice this relation is easily obtainable, at least to the extent that a plus or minus 25 per cent variation in $E_{20}$ makes only a few per cent change in the interval $T-t_0$.

Referring now to the apparatus indicated in Fig. 2, the timing relay is deenergized when the starting relay is operated and is energized a predetermined time thereafter. As before, when relay 44 is released the potential of battery 40 is applied to grid $G_1$ of tube 48 through resistances 41 and 47, and maximum plate current will flow in the left half of twin triode 28. The potential across condenser 43 is equal to the potential of battery 40 less the voltage drop across resistor 41 since the condenser is connected from the relay armature to ground. When the relay armature operates, condenser 43 begins to discharge through resistor 42. Thus, the potential between grid $G_1$ and ground does not suddenly drop to zero as before when the start relay operated, but the potential decays according to an exponential relation as indicated in Fig. 7. As discussed before, Fig. 9 shows the plate current-grid voltage curves which apply to a pair of triodes which operate into a common cathode load. Fig. 6 shows the plate current time curves applicable to the apparatus under consideration, and it will be observed that the current flowing through the left half of twin triode 48 begins to decay as soon as the start relay operates at time $t_0$. Shortly before the current through plate $P_1$ is cut off, current starts to flow through plate $P_2$ and relay 49 is operated at time T.

In order to restore the circuit, relay 44 is de-energized, thereby permitting the relay armature to return to its outer contact. Condenser 43 again charges to the potential of battery 40 less the voltage drop across resistor 41. When the potential across condenser 43 approaches the potential between grid $G_2$ and ground, the left half of twin triode 48 begins to conduct current and the current through the right half is cut off, thereby releasing relay 49. As soon as the condenser is completely charged, the circuit is restored and the timing action may be repeated.

As before, the potential applied to grid $G_2$ is equal to $$E_{40}\left(\frac{R_{52}}{R_{52}+R_{53}}\right)$$

However, the potential applied to grid $G_1$ is determined by the relation $$E=E_{40}\epsilon^{-\frac{t-t_0}{R_{42}C_{43}}}$$

Equating the two expressions gives $$E_{40}\epsilon^{-\frac{t-t_0}{R_{42}C_{43}}}=E_{40}\frac{R_{52}}{R_{52}+R_{53}}$$

When relay 29 operates at time T, T may be substituted for the symbol $t$ in the above equation and the equation may be reduced to the following:

$$T-t_0=R_{42}C_{43}\log_\epsilon\frac{R_{52}+R_{53}}{R_{52}}$$

The interval $T-t_0$ represents the interval of time between the operation of the start relay and the operation of timing relay 49, and the time expressed by this equation is independent of the potential of battery 40 as disclosed for the apparatus indicated in Fig. 1.

Figs. 10 and 11 indicate the circuit diagrams disclosed in Figs. 1 and 2 rearranged so that the voltage dividers and the resistance-capacitance timing networks employed in the circuits appear as elements of bridge circuits. Since only direct currents are employed in the circuit, the bridge is a voltage rather than an impedance bridge. From an inspection of these circuits it is readily apparent that the potential applied to the control grid of each tube is governed by the voltage unbalance in the bridge and that the voltage unbalance may be varied by the combined action of the starting relay and the resistance-capacitance timing network.

Improved operation may be secured by using a polar differential relay for the timing relay in the apparatus disclosed in Fig. 1 or 2. For such operation one winding of the relay must be placed in each anode circuit, the winding connected to the left half of the twin triode being poled in the non-operate direction so that current flowing therein will cause the relay armature to be forced against its stop, and the winding connected to the right half of the twin triode being poled in the operate direction so that current flowing therein will cause the relay armature to be forced against its contact. Fig. 3 indicates the application of a polar differential relay 69 to the timing circuit shown in Fig. 2. The apparatus is the same as that indicated in Fig. 2, with the exception that a polar differential relay is substituted for the conventional relay and the current for plate $P_1$ is supplied through one winding of the relay. The current which operates relay 69 is the difference between the current flowing through plate $P_2$ and that flowing through plate $P_1$. As before, Figs. 6, 7 and 9 show the various plate current and grid voltage relations which govern the operation of this timing relay. Fig. 8 shows the magnetomotive force time relations for the magnetic path of relay 69. It will be observed that the non-operate magnetomotive force begins to decay when the start relay operates at time $t_0$, and that the transition from non-operate to operate magnetomotive force is abrupt. Thus, it is apparent that the abrupt change in magnetomotive force will cause the relay to operate and that variations in operate time due to the mechanical operation of the relay armature will be minimized. Therefore, the operation of the timing apparatus indicated in Fig. 3 is substantially independent of supply voltage variations, and in addition is substantially independent of variations in operate time due to the mechanical operation of the relay armature.

While these timing circuits have been described on the basis of relay elements placed in the plate circuits of the tubes, it will be apparent that any current-responsive device might be substituted for the relay. For example, a magnetron or a magnetic amplifier might be utilized.

Also, separate thermionic tubes might be used instead of the twin triode as indicated in the drawings.

Although specific embodiments of this invention have been shown and described, it will be understood that modifications may be made therein without departing from the scope and spirit thereof as defined by the appended claim.

What is claimed is:

In a timing circuit operative substantially independently of supply voltage variations, a controlling vacuum tube and a controlled vacuum tube each having an anode, a cathode and a control grid, a sole source of potential, a current-responsive device adapted to respond to the flow of current of a predetermined magnitude through said controlled vacuum tube, a common cathode impedance connected between the cathodes of said vacuum tubes and the negative terminal of said sole source of potential, interconnecting means between the control grid of said controlled vacuum tube and the positive terminal of said sole source of potential adapted to apply a potential to the control grid of said controlled tube fixed with respect to the negative terminal of said sole source of potential, interconnecting means consisting exclusively of metallic conductors and resistors between the control grid of said controlling vacuum tube and the positive terminal of said sole source of potential, and controlling means supplied solely from said sole source of potential and comprising a capacitor connected at one end to said latter interconnecting means and at the other end to a switch means, said switch means being operable to selectively connect said capacitor either to the negative terminal of said sole source or to one end of a resistor, the other end of which is connected to the junction of said capacitor and said interconnecting means, said controlling means being adapted to vary the potential of the control grid of said controlling vacuum tube with respect to the negative terminal of said sole source of potential, the potentials applied to the control grids of said tubes being proportioned by both of said interconnecting means and by said common cathode impedance so that only one tube is permitted to pass maximum plate current at a time.

WILLIAM H. T. HOLDEN.

REFERENCES CITED

The following references are of record in the file of this patent:

UNITED STATES PATENTS

| Number | Name | Date |
|---|---|---|
| 1,552,321 | Lea | Sept. 1, 1925 |
| 2,003,992 | Cockrell | June 4, 1935 |
| 2,053,016 | Wilder | Sept. 1, 1936 |
| 2,264,873 | Cockrell | Dec. 2, 1941 |
| 2,300,999 | Williams | Nov. 3, 1942 |
| 2,306,237 | Wolfner | Dec. 22, 1942 |
| 2,313,906 | Wendt | Mar. 16, 1943 |
| 2,327,791 | Hopper | Aug. 24, 1943 |
| 2,383,822 | Schlesinger | Aug. 28, 1945 |
| 2,434,101 | Cann | Jan. 6, 1948 |
| 2,477,770 | Richter | Aug. 2, 1949 |